R. V. BINGAY.
WELDED STRUCTURE AND METHOD OF FORMING SAME.
APPLICATION FILED MAR. 26, 1921.

1,420,016.

Patented June 20, 1922.

Inventor
Robert V. Bingay
By his Attorneys
Edwards, Sager & Bower

UNITED STATES PATENT OFFICE.

ROBERT V. BINGAY, OF PITTSBURGH, PENNSYLVANIA, ASSIGNOR TO PITTSBURGH TRANSFORMER COMPANY, A CORPORATION OF PENNSYLVANIA.

WELDED STRUCTURE AND METHOD OF FORMING SAME.

1,420,016.  Specification of Letters Patent.  Patented June 20, 1922.

Application filed March 26, 1921. Serial No. 456,003.

*To all whom it may concern:*

Be it known that I, ROBERT V. BINGAY, a citizen of the United States, residing at Pittsburgh, in the county of Allegheny and State of Pennsylvania, have invented certain new and useful Improvements in Welded Structures and Methods of Forming Same, of which the following is a specification.

This invention relates to the welding of steel sheets for instance in the formation of containers such as corrugated tanks for cooling a circulating fluid such as the oil of an oil cooled transformer and the like. The object of the invention is to provide a structure in which the corrugated steel sheets are welded together in such manner that the joint will be strong and rigid and permanently tight. A further object of the invention is to provide a simple and inexpensive process for forming the weld. In prior practice the sheets have been brought together with the edges in substantially parallel planes so that only a small area of the edge surfaces were exposed to the grip of the weld and the tendency of the welding was to melt through in some places and skip others in very irregular and unsatisfactory manner forming a ragged weld with weak spots through which the oil would eventually seep.

In the structure of this invention the edges to be welded are brought into inclined relation to each other to form a groove adapted to receive the welding metal and to give it a firm and even grip on each end to securely bind the parts together permanently tight.

The invention is illustrated in the accompanying drawings in which—

Figure 1:
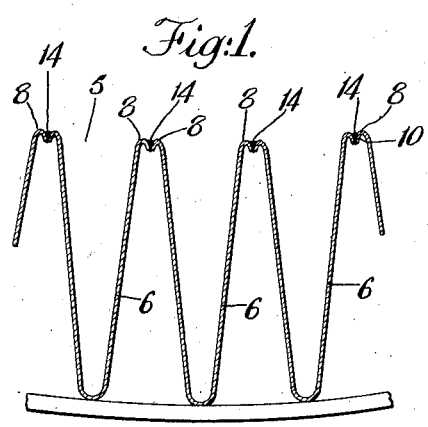
Fig. 1 is a sectional view illustrating the relation of the sheets to the weld in one specific embodiment of the invention.
Figure 2:
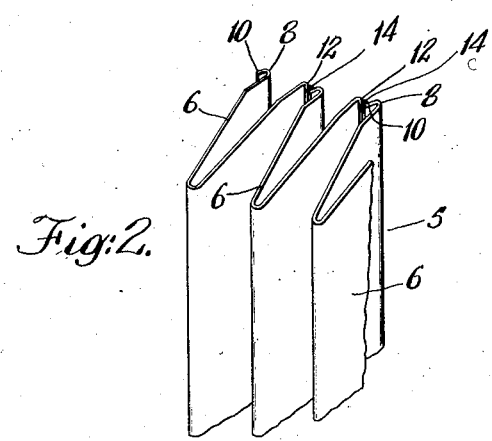
Fig. 2 is a perspective view of the corrugated sheets assembled for welding.
Figure 3:
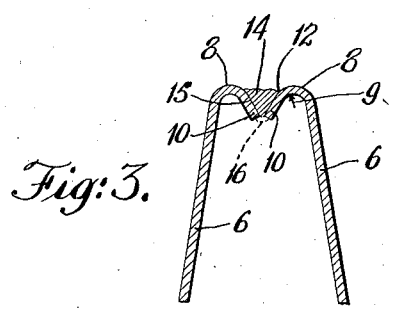
Fig. 3 is a sectional view of a detail of Fig. 1 on enlarged scale.

In the embodiment of the invention illustrated in the drawings a portion of the tank wall 5 is shown composed of corrugated steel sheets. Each sheet 6 forms a corrugation and the meeting edges of adjacent sheets are welded together throughout their length. The sheets are first bent into corrugated form and then have their edges turned over as indicated at 8 on a radius 9 of small curvature and with the edge 10 directed backward at an angle to the sheet.

The sheets are then assembled together so that the turned edges form between them the grooves 12 of generally V-shape and at each juncture the weld 14 is formed between the sides of this groove by melting metal into the groove progressively throughout its length. The inclined surfaces 15 of the groove provide extended surface for the weld and receive and guide the welding metal evenly at the bottom of the groove. And where the sheet edges do not fit tightly together the weld may protrude further through the bottom as indicated in dotted lines at 16.

In welding in this manner the edges are closely spaced at the bottom of the groove and the welding material has only a small space to bridge over. As the body of the weld builds up it extends outward in the groove 12 and as the surfaces 15 engaged by the weld are diverging they provide easy access and increasing space for the welding material which forms a solid mass 14 of generally triangular shape in section. Any irregularities are at the broadest part so as to be spread out into inconspicuous ripples and there is no tendency for the welding to melt through the body of the sheet at any point.

The inclined welded edges are firmly attached together and the weld is easily given the desired depth and kept substantially constant throughout the length of the sheet. The connections between the weld and the sheets are formed by the portions 8 which are smoothly curved and not sharply bent so as to overstress and weaken the metal. Each weld forms a dependable strengthening of the sheet edges throughout the tank which will not open up or leak in service. And this is particularly important in transformer and similar tanks in permitting them to be shipped full of oil and ready for service. Tanks thus shipped with oil are subjected to rough usage in transit and any resulting leakage is very expensive and troublesome to repair at the place of installation so that the strong permanently oil tight weld of this invention is very advantageous.

I claim:—

1. The method of welding the ends of metal sheets comprising bending the sheets so that both meeting ends in assembled position will extend in the same general direction, bending the meeting edge of each end around and back through an angle greater than a right angle, assembling said sheet ends side by side and extending in the same general direction and with the bent edges forming a re-entrant V-shaped groove between them, and forming a weld in said groove.

2. A fluid container body comprising a pair of sheet metal portions having their ends bent to extend side by side in the same general direction and with the meeting edge of each end bent around and back through an angle greater than a right angle to its respective end so as to form a re-entrant V-shaped groove with straight inclined sides between said edges, and a weld formed in said groove.

ROBERT V. BINGAY.